3,609,869
LINEAR MEASURING DEVICE HAVING A
HANDLE THROUGH WHICH THE MEASUR-
ING TAPE EXTENDS
André Quenot, Besancon, France, assignor to Quenot &
Cie S.a.r.l., Besancon, France
Filed Feb. 10, 1969, Ser. No. 795,154
Claims priority, application France, Mar. 8, 1968,
142,865
Int. Cl. G01b 3/02, 3/10
U.S. Cl. 33—138                 2 Claims

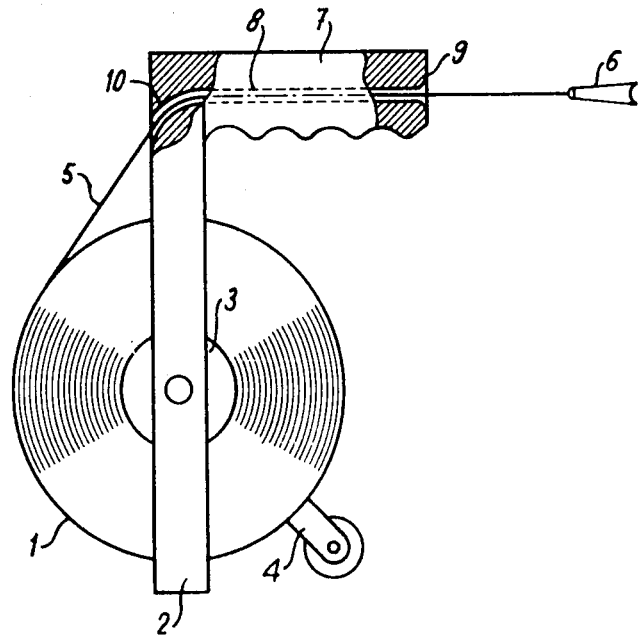

ABSTRACT OF THE DISCLOSURE

A linear measuring device comprises a flexible measuring tape wound on a rotatable drum and a handle connected to the drum whereby the device may be hand-held during a measuring operation. The handle is provide with a bore through which the measuring tape passes and arcuate surfaces are provided within the bore to reduce the frictional resistance between the measuring tape and bore during winding and unwinding of the tape from the drum.

---

This invention relates to a linear measuring instrument having a handle through which a graduated measuring tape may be extended and retracted.

There is already known numerous types of linear measuring instruments having a flexible measuring tape in which the tape is wound on a rotatable drum inside a frame and being provided with a handle for holding the instrument. These instruments however have the drawback of not permitting a secure grasping, particularly when the assistant surveyor who holds the end of the tape pulls hard on the tape to eliminate the sway due to its weight or to the action of the wind. This pulling force which is generally applied at the point where the tape enters into the instrument may cause the hand of the user to deviate and thereby lead to errors in measurement.

The present invention provides an improved linear measuring instrument which can be readily held despite a pull being exerted on the tape. The invention also makes possible the direct reading of internal measurements.

To this effect, the invention is concerned with an improved linear measuring instrument having a flexible measuring tape wound on a drum rotatably mounted in a frame or casing, characterized in that it comprises a handle separate from the casing and having disposed interiorily thereof inner guiding means for ensuring the exit of the tape at the end of the handle.

The invention will be better understood by referring to the following description made by way of non-limiting example and to the accompanying drawing which shows a partial cross section of an instrument according to the invention which has a frame.

Reference is made to FIG. 1.

The measuring device of the present invention comprises a support frame 2 having a drum 3 rotated by a winding means or handle 4. On this drum 3 winds a flexible measuring tape 5 having measuring indicia thereon the free extremity or leading end of which terminates, for example, a manually engageable in pull out ring 6.

A handle portion 7 of any shape is positioned at one of the ends of the frame 2 and projects outwardly therefrom in order to form with this frame a suitable angle, for example a right angle as shown in the figure. The said handle 7 has a tape-receiving bore or through hole 8 therein allowing the tape 5 to pass from one end 9 to the other end 10 thereof from which the pull-out ring 6 extends.

The dimensions of the longitudinal bore 8 in height and width are selected to ensure easy passage of the tape 5 through handle 7. The handle portion 7 is preferably made of synthetic material which reduces frictional resistance and ensures good sliding of the tape 5 against the walls or surface portions of hole 8. Frictional resistance is also reduced by providing the front end 10 of hole 8 with a longitudinal curvature flaring outwardly in order to allow for a tangential contact of tape 5 against hole 8 regardless of the extent of unwinding of tape 5. As shown in FIG. 1, the curvature varies as a function of the radius of the tape 5 not yet unwound from the drum 3 and this ensures that the tape enters the hole 10 provided in the handle portion 7 tangent to the interior surface thereof, thereby providing for easy unwinding of the tape. Moreover, the outer end 9 of hole 8 can be flared and have rounded shapes in order not to place tape 5 in contact with sharp edges and to maintain the tape tangent to the bore 8 so that the tape may be easily unwound by the user.

Naturally other shapes of hole 8 can be provided according to the relative dispositions of the frame and of the handle.

Although the invention has been described with respect to one particular embodiment thereof it is understood that the same is in no way limited thereto and that there can be brought to it all modifications of shape or dimension without thereby departing from its framework or its scope.

What is claimed is:

1. A measuring device comprising: a support frame having a handle portion configured to be grasped by the hand of a user during a measuring operation; means defining a tape-receiving bore extending through said handle portion; a drum rotatably mounted on said support frame; a flexible measuring tape having measuring indicia thereon removably wound around said drum and manually unwound therefrom to effect a measuring operation, said tape being threaded through said tape-receiving bore and terminating in a manually engageable leading end extending from one end of said tape-receiving bore, winding means for rewinding said flexible measuring tape around said drum after same has been unwound therefrom; and means for reducing frictional resistance between said flexible measuring tape and surface portions of said tape-receiving bore during unwinding thereof from said drum comprising a longitudinal curvature at the other end of said tape-receiving bore having a varying curvature effective to maintain said measuring tape tangent thereto at the point of contact during unwinding of said measuring tape from said drum.

2. A measuring device according to claim 1; wherein said support frame comprises an elongated support member having said drum rotatably mounted thereon, and wherein said handle portion projects outwardly from said elongated support member, and wherein said one end of said tape-receiving bore has a flared portion.

References Cited

UNITED STATES PATENTS

| | | | |
|---|---|---|---|
| 375,026 | 12/1887 | Tuxbury | 33—139 |
| 2,842,853 | 7/1958 | Hubbert | 33—138 |
| 3,255,531 | 6/1966 | Anderson | 33—138 |

LEONARD FORMAN, Primary Examiner

S. STEPHAN, Assistant Examiner